(12) United States Patent
Zhang et al.

(10) Patent No.: US 10,885,379 B2
(45) Date of Patent: Jan. 5, 2021

(54) MULTI-VIEW IMAGE CLUSTERING TECHNIQUES USING BINARY COMPRESSION

(71) Applicant: Inception Institute of Artificial Intelligence, Ltd., Abu Dhabi (AE)

(72) Inventors: Zheng Zhang, Shenzhen (CN); Li Liu, Abu Dhabi (AE); Jie Qin, Abu Dhabi (AE); Fan Zhu, Abu Dhabi (AE); Fumin Shen, Chengdu (CN); Yong Xu, Shenzhen (CN); Ling Shao, Abu Dhabi (AE); Heng Tao Shen, Chengdu (CN)

(73) Assignee: INCEPTION INSTITUTE OF ARTIFICIAL INTELLIGENCE, LTD., Al Maryah Island (AE)

( * ) Notice: Subject to any disclaimer, the term of this patent is extended or adjusted under 35 U.S.C. 154(b) by 245 days.

(21) Appl. No.: 16/120,694

(22) Filed: Sep. 4, 2018

(65) Prior Publication Data

US 2020/0074220 A1     Mar. 5, 2020

(51) Int. Cl.
  *G06K 9/00* (2006.01)
  *G06K 9/62* (2006.01)
  *G06K 9/48* (2006.01)

(52) U.S. Cl.
  CPC .......... *G06K 9/6218* (2013.01); *G06K 9/481* (2013.01); *G06K 9/6262* (2013.01)

(58) Field of Classification Search
  None
  See application file for complete search history.

(56) References Cited

U.S. PATENT DOCUMENTS

| | | | |
|---|---|---|---|
| 2005/0031196 A1* | 2/2005 | Moghaddam | G06T 17/00 382/154 |
| 2014/0258295 A1* | 9/2014 | Wang | G06F 16/5838 707/737 |
| 2017/0060904 A1* | 3/2017 | Pau | G06F 16/5854 |

OTHER PUBLICATIONS

Zhang, et al. "Binary Multi-View Clustering," IEEE Transactions on Pattern Analysis and Machine Intelligence, vol. 41, No. 7, Jun. 18, 2018. Sections 1, 2, 3.3, and figs. 2, 3.

Liu, et al. "Multiview Alignment Hashing for Efficient Image Search," IEEE Transactions on Image Processing. vol. 24, No. 3 2015 whole document.

Jain, A.K.: Data clustering: 50 years beyond k-means. PRL 31(8) (2010) 651-666.

Hartigan, J.A., Wang, M.A.: Algorithm as 136: A k-means clustering algorithm. J. R. Stat. Soc., Series C 28(1) (1979) 100-108.

(Continued)

*Primary Examiner* — Hadi Akhavannik
(74) *Attorney, Agent, or Firm* — Bryan Cave Leighton Paisner LLP (57) ABSTRACT

This disclosure relates to improved techniques for performing multi-view image clustering. The techniques described herein utilize machine learning functions to optimize the image clustering process. Multi-view features are extracted from a collection of images. A machine learning function is configured to jointly learn a fused binary representation that combines the multi-view features and one or more binary cluster structures that can be used to partition the images. A clustering function utilizes the fused binary representation and the one or more binary cluster structures to generate one or more image clusters based on the collection of images.

21 Claims, 4 Drawing Sheets

(56) References Cited

OTHER PUBLICATIONS

Sculley, D.: Web-scale k-means clustering. In: WWW, ACM (2010) 1177-1178.
Bendechache, M., M-Tahar, Nhien-An, L.K.: Efficient large scale clustering based on data partitioning. In: IEEE DSAA, IEEE (2016) 612-621.
Otto, C., Wang, D., Jain, A.K.: Clustering millions of faces by identity. TPAMI 40(2) (2018) 289-303.
Avrithis, Y., Kalantidis, Y., Anagnostopoulos, E., Emiris, I.Z.: Web-scale image clustering revisited. In: ICCV. (2015) 1502-1510.
Bickel, S., Scheffer, T.: Multi-view clustering, In: ICDM. vol. 4, (2004) 19-26.
Xu, C., Tao, D., Xu, C.: A survey on multi-view learning. arXiv preprint (2013).
Zhao, J., Xie, X., Xu, X., Sun, S.: Multi-view learning overview: recent progress and new challenges. Inf. Fusion 38 (2017) 43-54.
Xia, T., Tao, D., Mei, T., Zhang, Y.: Multiview spectral embedding. IEEE TCYB 40(6) (2010) 1438-1446.
Liu, J., Wang, C., Gao, J., Han, J.; Multi-view clustering via joint nonnegative matrix factorization. In: ICDM, SIAM (2013) 252-260.
Cai, X., Nie, F., Huang, H.: Multi-view k-means clustering on big data. In: IJCAI. (2013) 2598-2604.
Kumar, A., Rai, P., Daume, H.: Co-regularized multi-view spectral clustering. In: NIPS. (2011) 1413-1421.
Nie, F., Li, J., Li, X., et al.: Parameter-free auto-weighted multiple graph learning: A framework for multiview clustering and semi-supervised classification. In: IJCAI. (2016) 1881-1887.
Nie, F., Cai, G., Li, X.: Multi-view clustering and semi-supervised classification with adaptive neighbours. In: AAAI. (2017) 2408-2414.
Shao, W., He, L., Lu, C.t., Philip, S.Y.: Online multi-view clustering with incomplete views. In: ICBD, IEEE (2016) 1012-1017.
Geo, H., Nie, F., Li, X., Huang, H.: Multi-view subspace clustering. In: ICCV. (2015) 4238-4246.
Wang, X., Guo, X., Lei, Z., Zhang, C., Li, S.Z.: Exclusivity-consistency regularized multi-view subspace clustering. In: CVPR. (2017) 923-931.
Zhang, C., Hu, Q., Fu, H., Zhu, P., Cao, X.: Latent multi-view subspace clustering. In: CVPR. vol. 30. (2017) 4279-4287.
Ng, A.Y., Jordan, M.I., Weiss, Y.: On spectral clustering: Analysis and an algorithm. In: NIPS. (2002) 849-856.
Lee, D.D., Seung, H.S.; Algorithms for non-negative matrix factorization. In: NIPS. (2001) 556-562.
Tzortzis, G., Likas, A.: Kernel-based weighted multi-view clustering. In: ICDM, IEEE (2012) 675-684.
De Sa, V.R., Gallagher, P.W., Lewis, J.M., Malave, V.L.: Multi-view kernel construction. Mach. Learn. 79(1-2) (2010) 47-71.
Gong, Y., Pawlowski, M., Yang, F., Brandy, L., Bourdev, L., Fergus, R.: Web scale photo hash clustering on a single machine. In: CVPR. (2015) 19-27.
Shen, X.B., Liu, W., Tsang, I.W., Shen, F., Sun, Q.S.: Compressed k-means for large-scale clustering. In: AAAI. (2017) 2527-2533.

Wang, J., Zhang, T., Sebe, N., Shen, H.T., et al.: A survey on learning to hash. TPAMI (2017).
Shen, F., Shen, C., Liu, W., Tao Shen, H.: Supervised discrete hashing. In: CVPR. (Jun. 2015) 37-45.
Shen, F., Mu, Y., Yang, Y., Liu, W., Liu, L., Song, J., Shen, H.T.: Classification by retrieval: binarizing data and classifier, In: ACM SIGIR. (2017) 595-604.
Lu, J., Liong, V.E., Zhou, J.: Simultaneous local binary feature learning and encoding for homogeneous and heterogeneous face recognition. TPAMI (2017).
Gong, Y., Lazebnik, S., Gordo, A., Perronnin, F.: Iterative quantization: A procrustean approach to learning binary codes for large-scale image retrieval. TPAMI 35(12) (2013) 2916-2929.
Liu, W,, Wang, J., Kumar, S., Chang, S.F.: Hashing with graphs. In: ICML, Citeseer (2011) 1-8.
Liu, W., Mu, C., Kumar, S., Chang, S.F.: Discrete graph hashing. In: NIPS. (2014) 3419-3427.
Baluja, S., Covell, M.: Learning to hash: forgiving hash functions and applications. Data Mining and Knowledge Discovery 17(3) (Dec. 2008) 402-430.
Wang, J., Kumar, S., Chang, S.F.: Semi-supervised hashing for scalable image retrieval. In: CVPR, IEEE (2010) 3424-3431.
Ding, C., Zhou, D., He, X., Zha, H.: R1-pca: rotational-norm principal component analysis for robust subspace factorization. In: ICML, ACM (2006) 281-288.
Shen, F., Zhou, X., Yang, Y., Song, J., Shen, H.T., Tao, D.: A fast optimization method for general binary code learning, TIP 25(12) (2016) 5610-5621.
Deng, J., Dong, W., Socher, R., Li, L.J., Li, K., Li, F.F.: Imagenet: A large-scale hierarchical image database. In: CVPR, IEEE (2009) 248-255.
Krizhevsky, A., Hinton, G.: Learning multiple layers of features from tiny images. (2009).
Wolf, L., Hassner, T., Maoz, I.: Face recognition in unconstrained videos with matched background similarity. In: CVPR, IEEE (2011) 529-534.
Chua, T.S., Tang, J., Hong, R., Li, H., Luo, Z., Zheng, Y.: Nus-wide: A real-world web image database from national university of singapore. In: ACM International Conference on Image and Video Retrieval, ACM (2009) 48.
Manning, C.D., Raghavan, P., Schütze, H., et al.: Introduction to information retrieval. vol. 1. Cambridge university press Cambridge (2008).
Park, H.S., Jun, C.H.: A simple and fast algorithm for k-medoids clustering. Expert Syst. Appl. 36(2) (2009) 3336-3341.
Chitta, R., Jin, R., Havens, T.C., Jain, A.K.: Approximate kernel k-means: Solution to large scale kernel clustering. In: SIGKDD, ACM (2011) 895-903.
Chen, W.Y., Song, Y., Bai, H., Lin, C.J., Chang, E.Y.: Parallel spectral clustering in distributed systems. TPAMI 33(3) (2011) 568-586.
Chen, X., Cai, D.: Large scale spectral clustering with landmark-based representation. In: AAAI. vol. 5. (2011) 14.
Li, Y., Nie, F., Huang, H., Huang, J.: Large-scale multi-view spectral clustering via bipartite graph. In: AAAI. (2015) 2750-2756.

\* cited by examiner

MULTI-VIEW IMAGE CLUSTERING TECHNIQUES USING BINARY COMPRESSION

TECHNICAL FIELD

This disclosure is related to improved multi-view image clustering techniques and, more particularly, to multi-view image clustering techniques that utilize machine learning and artificial intelligence (AI) algorithms to jointly learn cluster structures and multi-view binary representations to perform image clustering.

BACKGROUND

Generally speaking, the aim of image clustering is to discover the natural and interpretable structures of image representations in a manner that permits grouping of similar images into the same clusters. Multi-view image clustering can involve classifying similar images into the same clusters by combining multiple features sets (e.g., which can be derived from different feature descriptors). Multi-view image clustering can be applied in a wide variety of computer vision applications.

Various technical obstacles impede the effective implementation of multi-view image clustering on large datasets (e.g., "big data") with high dimensionality. While current techniques may have the ability to perform multi-view image clustering on small or medium-sized datasets to some limited extent, these techniques cannot be applied on large datasets due to high computational and memory costs. These high computational and memory costs are due, at least in part, to the use of real-valued features in performing the image clustering. These real-valued features create a bottleneck, which significantly increases the computational complexity and restricts the scalability of the clustering procedure.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to systems, methods, apparatuses, and computer program products that are configured to implement improved multi-view image clustering (MVIC) techniques. In certain embodiments, the improved techniques for performing multi-view image clustering utilize a machine learning architecture that is capable of jointly learning fused binary representations and binary cluster structures. The fused binary representations can be learned to combine the features from multiple views into compact binary codes that preserve both shared information that is common among the multiple views and view-specific information that is particular to specific views. The joint machine learning framework can simultaneously learn the binary cluster structures that are utilized to partition a collection of images into separate groupings. Once trained, the fused binary representations and binary cluster structures can be utilized to execute image clustering operations on large-scale datasets (e.g., "big data") that have multi-view features with high dimensionality.

The joint learning framework is superior to separate learning techniques because it allows for collaboration between the optimization objectives associated with learning with the fused binary representations and the binary cluster structures. The multi-view image clustering techniques described herein are able to improve the memory costs and computational time associated with performing the clustering operations, while also improving the accuracy of the clustering results in comparison to traditional approaches. Because these techniques utilize a binary compression technique that reduces the complexity of the clustering procedure, these techniques are able to be utilized on large-scale image datasets and they can be executed by devices (e.g., mobile devices and wearable devices) that have limited computational resources.

As used herein, the term "multi-view" is generally intended to refer to scenarios in which multiple sets of features are obtained from images (e.g., which can be derived from different feature descriptors). Thus, the multi-view image clustering techniques described herein include solutions for clustering images when there are different sets of features available for the images. Unless indicated otherwise, the use of the term "multi-view" is generally not intended to refer to situations involving multiple domains or multiple modalities.

Given an image dataset, a feature extraction function can be configured to extract features from each image for a plurality of different views. In certain embodiments, this multi-view feature set can include features that are derived using local binary pattern (LBP) feature extraction techniques, histogram of oriented gradients (HOG) feature extraction techniques, and/or GIST feature extraction techniques. Other types of feature extraction techniques can also be utilized to generate the multi-view feature set. The multi-view feature set generated from the image dataset may initially be normalized to allow for comparison of features across the different views. In certain embodiments, this may involve converting the features from each view to a zero-centered vector.

A joint machine learning function can include both a binary compression learning function and a cluster structure learning function for jointly learning a fused binary representation and binary cluster structures, respectively. In certain embodiments, the binary compression learning function learns the fused binary representation by mapping or projecting the multi-view features on a Hamming space. The features from the different views can be mapped or projected to this common space in a manner that preserves overlapping or shared information that is common to the multiple views, as well as view-specific information associated with each of the views. The fused binary representation can be learned from this mapping information by capturing the underlying correlations among the multiple views.

The cluster structure learning function utilizes the fused binary representation to learn the binary cluster structures that are used to partition the image dataset into similar groups of images. In certain embodiments, the cluster structure learning function learns the binary cluster structure, at least in part, by factorizing or separating the fused binary representation into a centroid matrix and a cluster indicator matrix. The centroid matrix can be used to identify a centroid (e.g., a central or middle point) for each of the clusters, while the cluster indicator matrix can be used to indicate or calculate distance measures of images from the centroids. In order to mitigate the influence of outlier values and achieve a more stable clustering performance, a sparsity-induced norm can also be applied to the cluster structure learning procedure.

A joint machine learning function can then be utilized to optimize both the binary compression learning function and the clustering structure learning function, while preserving the semantic interconnections between the fused binary representation and the binary cluster structures. This machine learning function can execute an algorithm that alternates between optimizing the binary compression learning function and the clustering structure learning function. As explained in further detail below, the alternating optimization function can iteratively update and optimize parameters for the feature set mappings, the fused binary representations, and the cluster structures, which include the centroid and indicator matrices.

The multi-view image clustering techniques described herein can be used in a variety of different contexts and environments. Certain useful applications can be applied in the context of systems that utilize or rely on computer vision. For example, these techniques can be applied in the context of computer vision systems for performing intelligent surveillance, classification, object tracking, and/or event detection. These techniques can be applied in other contexts as well.

The embodiments described herein provide a variety of advantages over conventional clustering techniques. One significant advantage is the ability to accurately interpret the structure of the image representations to discern information and categorize the images. This information can be integrated into various systems (e.g., computer vision systems and surveillance systems) to improve the intelligence of such systems. Another significant advantage is the ability to partition the large-scale datasets (e.g., big data) having features from multiple views in a manner that lowers computational and memory costs, while improving the accuracy of the categorization results. The lower computational and memory costs can be attributed, at least in part, to the elimination or reduction of time-consuming Euclidean distance measures (e.g., typically of $\vartheta(Nd)$ complexity, where N and d respectively indicate the data size and dimension) by transforming the real-valued Euclidean space to the low-dimensional binary Hamming space, and utilizing extremely fast XOR (exclusive OR) operations on binary codes. This permits the clustering techniques to be utilized on devices in which the computation and memory resources are limited (e.g., on wearable or mobile devices). The accuracy of the categorization results can be attributed, at least in part, to the improved functions that generate fused binary representations and cluster structures, as well as the joint learning framework that optimizes these functions.

As evidenced by the disclosure herein, the multi-view clustering techniques set forth in the disclosure are rooted in computer technologies that overcome existing problems in known image clustering systems and, particularly, problems dealing with improving the memory costs and computational times associated with conducting multi-view clustering on large-scale image datasets (e.g., big data). These techniques describe a technical solution (e.g., one that utilizes various. AI-based and machine learning techniques) for overcoming such limitations. For example, the multi-view image clustering system described herein takes advantage of novel AI and machine learning techniques to learn functions for compressing a multi-view feature set into a fused binary representation and for generating robust clustering structures that can be used to partition the image dataset. This technology-based solution marks an improvement over existing computing capabilities and functionalities related to multi-view image clustering techniques by allowing large-scale datasets to be partitioned in a manner that improves the accuracy, the speed, and the computational costs of the clustering techniques.

In certain embodiments, a system for performing multi-view image clustering comprising: one or more computing devices comprising one or more processors and one or more non-transitory storage devices for storing instructions, wherein execution of the instructions by the one or more processors causes the one or more computing devices to: process a collection of images to obtain multi-view features corresponding to a plurality of views; execute a machine learning function that is configured to jointly learn a fused binary representation that combines the multi-view features and one or more binary cluster structures; and execute a clustering function that utilizes the fused binary representation and the one or more binary cluster structures to generate one or more image clusters based on the collection of images.

In certain embodiments, a method is provided for performing multi-view image clustering comprising: processing a collection of images to obtain multi-view features corresponding to a plurality of views, the collection of images being stored on one or more non-transitory storage devices; executing, with one or more processors, a machine learning function that is configured to jointly learn a fused binary representation that combines the multi-view features and one or more binary cluster structures; and executing, with one or more processors, a clustering function that utilizes the fused binary representation and the one or more binary cluster structures to generate one or more image clusters based on the collection of images.

In certain embodiments, a computer program product for performing multi-view image clustering, the computer program product comprising a non-transitory computer-readable medium including codes for causing a computer to: process a collection of images to obtain multi-view features corresponding to a plurality of views; execute a machine learning function that is configured to jointly learn a fused binary representation that combines the multi-view features and one or more binary cluster structures; and execute a clustering function that utilizes the fused binary representation and the one or more binary cluster structures to generate one or more image clusters based on the collection of images.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature, or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or a solid state memory, a magnetic tape, a removable computer diskette, a random access memory (RAM), a read-only memory (ROM), a rigid magnetic disk, and an optical disk.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including, but not limited to, keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 1:
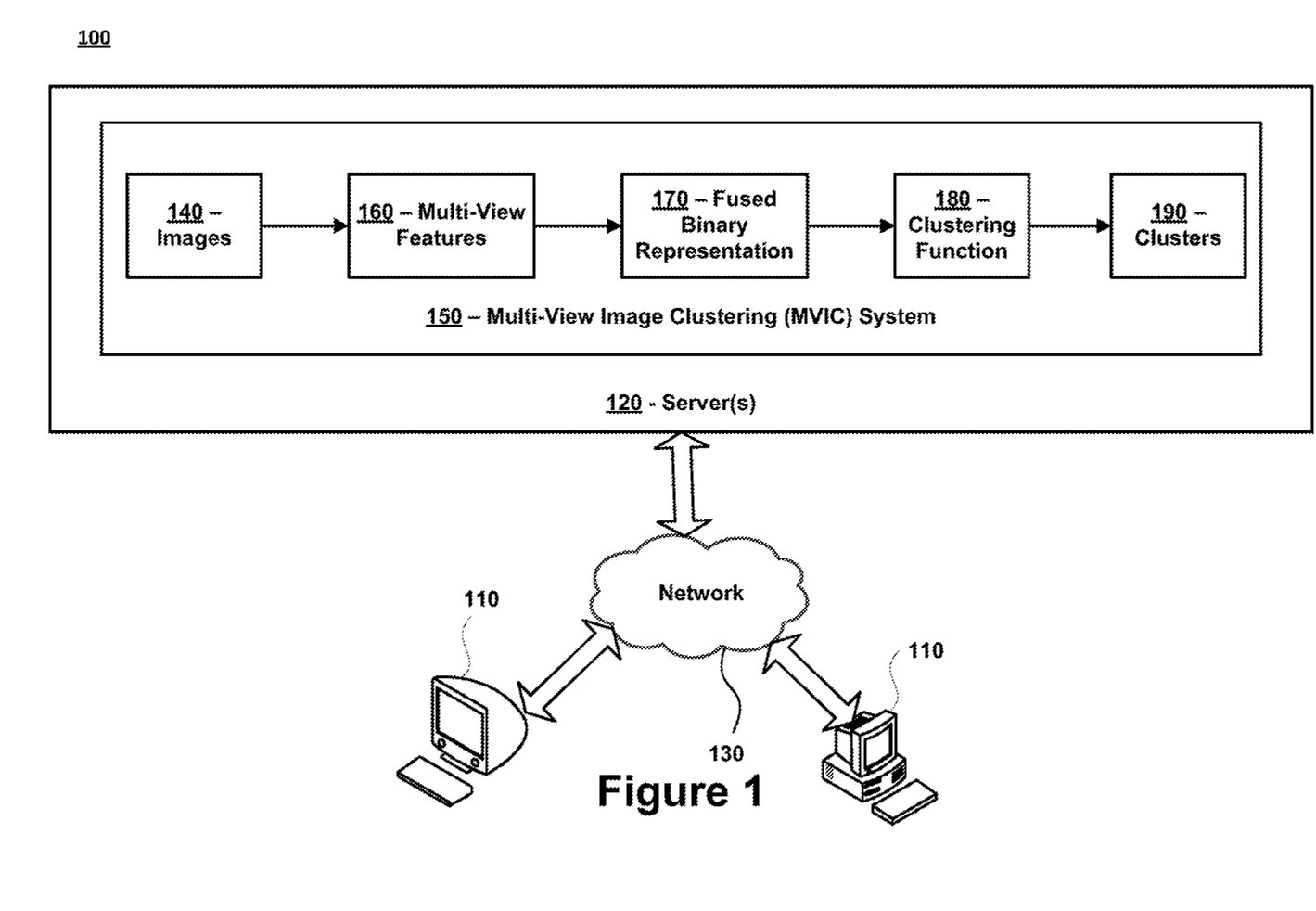
FIG. 1 is a block diagram of a system in accordance with certain embodiments.

FIG. 1 is an exemplary system 100 for implementing the multi-view image clustering techniques described herein. In this exemplary system 100, a multi-view image clustering (MVIC) system 150 is stored on one or more servers 120. The MVIC system 150 may be utilized in a variety of different contexts. For example, the MVIC system 150 may be integrated into various systems that utilize computer vision technologies. For example, the MVIC system 150 may be integrated into systems that are configured to perform functions related to surveillance, classification, object tracking, and/or event detection. The MVIC system 150 can be integrated into other types of systems as well.

The MVIC system 150 can be configured to perform any and all functions described herein with respect to clustering, partitioning, and/or grouping images 140 into one or more clusters 190. Generally speaking, the MVIC system 150 can be configured to receive a dataset comprising a plurality of images 140 and to classify the images 140 having the same or similar subject matter into the same clusters 190. For example, an exemplary dataset may include images 140 corresponding to various individuals, and the MVIC system 150 can partition the images into a plurality of clusters 190 such that the images 140 corresponding to each individual are included in a separate cluster 190. As another example, an exemplary dataset may include images 140 corresponding to vehicles, and the MVIC system 150 can partition the images into a plurality of clusters 190 such that the images 140 corresponding to each vehicle type are included in a separate cluster 190. As another example, an exemplary dataset may include images 140 that correspond to a wide variety of unrelated concepts (e.g., individuals, buildings, landscapes, clothing, etc.), and the MVIC system 150 can partition the images into a plurality of clusters 190 such that the images 140 corresponding to each concept are included in a separate cluster 190 (e.g., such that individuals are grouped in a first cluster, buildings are grouped in a second cluster, landscapes are grouped in a third cluster, clothing is grouped in a fourth cluster, etc.).

The images 140 processed by the MVIC system 150 may represent digital representations of photographs, pictures, or the like. For example, the images 140 may initially be captured by recording light or other electromagnetic radiation electronically (e.g., using one or more image sensors) or chemically (e.g., using light-sensitive materials or films). The images 140 may further include drawings, paintings, graphical depictions, sketches, hand-drawn content, or the like. In certain embodiments, the images 140 be associated with, or derived from, videos, animations, or the like. Any images 140 that are not originally created in a digital format can be converted to a digital format using appropriate conversion devices (e.g., image scanners and optical scanners).

The clusters 190 generally represent or correspond to groups of the images 140 that have been partitioned or classified based on their similarity to one another. The clusters 190 may alternatively, or additionally, correspond to data that can be used to classify or partition the images 140 into different groups (e.g., data that maps the images 140 to different groups or partitions).

Before classifying the images 140 into clusters, multi-view features 160 can be extracted from the images 140 using a plurality of feature extraction techniques. Generally speaking, each separate set of features extracted from the images 140 can represent a different "view," and collectively comprise the "multi-view" features 160 when considered together. In certain embodiments, the multi-view features 160 can be obtained by using a plurality of different feature descriptors (e.g., visual image descriptors). Each of the feature descriptors can describe the characteristics of the images 140 (e.g., such as the shape, color, texture, and/or motion information in the images 140) in a different manner and/or different format. In some cases, the features generated by each feature descriptor can overlap with one or more of the other feature descriptors. Each visual descriptor can also identify heterogeneous or individual features for the images 140 that are unique to the feature descriptor. In certain embodiments, the multi-view features 160 can include some or all of the following features: local binary pattern (LBP) features; histogram of oriented gradients (HOG) features, and/or GIST features. Other types of features may also be included in the multi-view features 160. The multi-view features 160 may initially be normalized to facilitate a comparison of features across the different views.

As explained in further detail below, a machine learning function is utilized to derive a fused binary representation 170 from the multi-view features 160. The fused binary representation 170 can represent a binary code or matrix that combines the features from each of the views into a single, unified representation. In certain embodiments, the fused binary representation 170 is generated by mapping or projecting the features from the different views into a low-dimensional, binary Hamming space. The mapping or projecting of the features onto the common Hamming space allows for identification of overlapping or shared similarities among the views, and for the identification of view-specific information that distinguishes individual characteristics among the views. The fused binary representation 170 is generated such that it is capable of preserving both shared information and view-specific information among the views.

A clustering function 180 is executed to classify the images 140 into one or more clusters 190. For example, after the fused binary representation 170 is generated for each of the images 140 based on the corresponding multi-view features 160 computed for each of the images 140, the clustering function 180 can utilize the fused binary representations 170 corresponding to each of the images 140 to assign the images 140 to clusters 190 based on their similarities. As explained in further detail below, the clustering function 180 can utilize binary cluster structures, which are also learned using the machine learning function, to classify the images 140 into the clusters 190.

After the images 140 are partitioned into different clusters 190 by the clustering function 180, the results may be utilized in connection with various applications. For example, as mentioned above, the results may be utilized by various computer vision applications. The clustering results can be used in other contexts as well.

The requests to perform MVIC can be submitted directly to the MVIC system 150 (e.g., using one or more input devices attached to the one or more servers 120 hosting the MVIC system 150). Likewise, the results of the MVIC operations can be provided directly to the MVIC system 150. The requests and results can additionally, or alternatively, be submitted by, and/or provided to, one or more computing devices 110. For example, as shown in FIG. 1, a plurality of computing devices 110 may be connected to the MVIC system 150 to enable remote users to access the MVIC system 150 over a network 130. The servers 120 and computing devices 110 may present information and interfaces that enable individuals to submit the requests to performing MVIC operations and to view the retrieval results generated by the MVIC system 150 (e.g., to view the partitioning of the images 140 into clusters 190 and other information related to the classification operations). The interfaces can be generated by the MVIC system 150. The interfaces can include graphs, statistics, and other data associated with the classification results and/or processing of the images 140. The interfaces provided to the servers 120 and computing devices 110 may also enable individuals to perform functions related to controlling and managing the MVIC system 150.

In certain embodiments, the computing devices 110 may represent desktop computers, laptop computers, mobile devices (e.g., smart phones, personal digital assistants, tablet devices, vehicular computing devices, wearable devices, or any other devices that are mobile in nature), or other types of computing devices. In certain embodiments, the MVIC system 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers capable of communicating with the computing devices 110 and/or other devices over the network 130. The network 130 may represent any type of communication network, e.g., such as one that comprises a local area network (e.g., a Wi-Fi network), a personal area network (e.g., a Bluetooth network), a wide area network, an intranet, the Internet, a cellular network, and/or other types of networks.

All the components illustrated in FIG. 1, including the computing devices 110 and servers 120, can be configured to communicate directly with each other and/or over the network 130 via wired or wireless communication links, or a combination of the two. The computing devices 110 and servers 120 can also be equipped with one or more transceiver devices, one or more computer storage devices (e.g., RAM, ROM, PROM, SRAM, etc.), and one or more processing devices (e.g., a central processing unit) that are capable of executing computer program instructions. The computer storage devices are preferably physical, non-transitory mediums.

Figure 2:
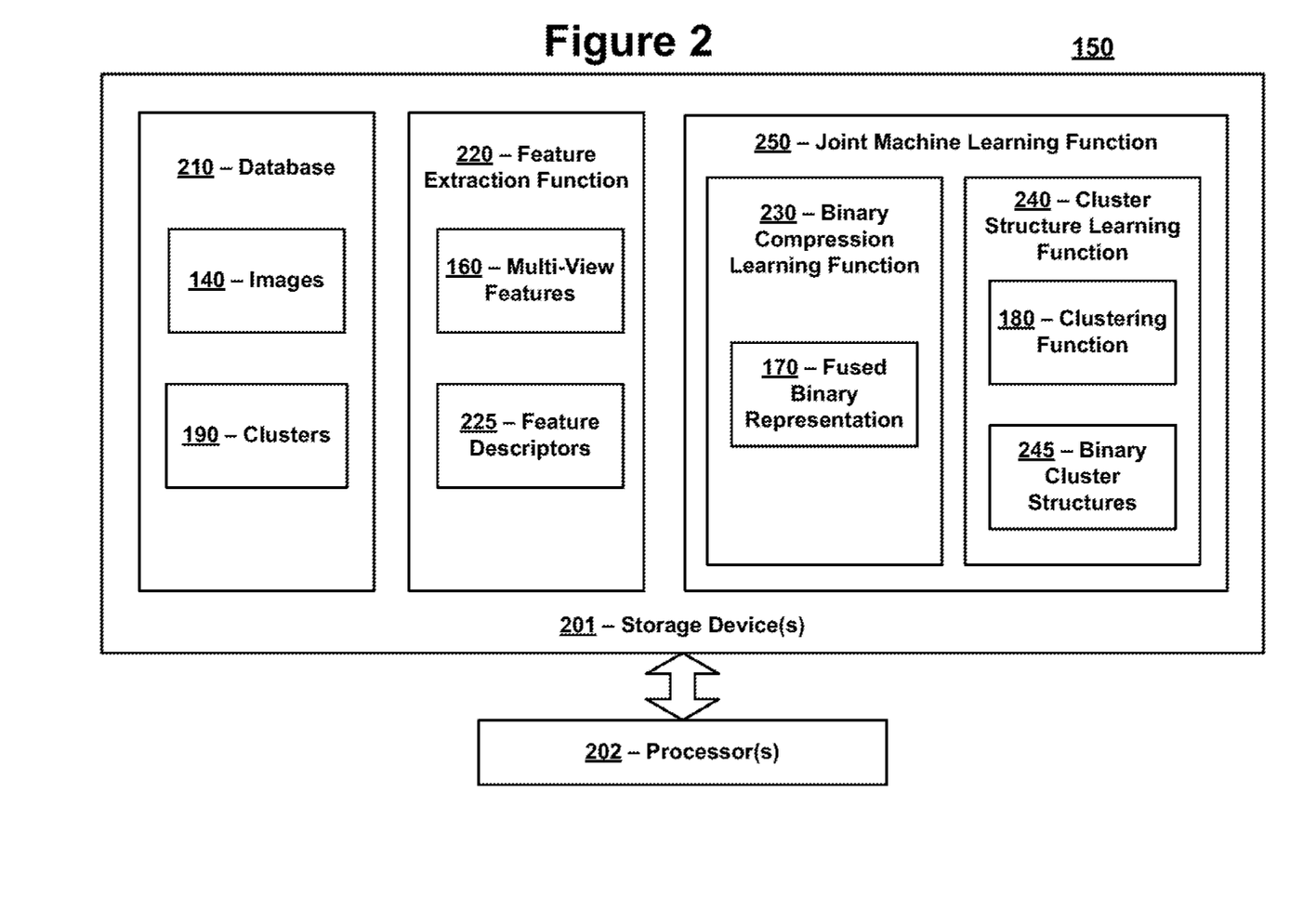
FIG. 2 is a block diagram of a multi-view image clustering system in accordance with certain embodiments.

FIG. 2 is a block diagram of an exemplary multi-view image clustering system 150 in accordance with certain embodiments. The MVIC system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), or static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 store data and instructions associated with a database 210, a feature extraction function 220, a binary compression learning function 230, a cluster structure learning function 240, and a joint machine learning function 250. The one or more processors 202 are configured to execute instructions associated with these components. Each of these components is described in further detail below.

The database 210 stores the images 140 and clusters 190. As mentioned above, the images 140 can include photos, drawings, or the like. The images 140 be can included in one or more datasets, which can include small-scale, medium scale, and/or large-scale datasets. In contrast to traditional approaches, the MVIC techniques discussed herein are able to be applied to large-scale datasets. As mentioned above, the clusters 190 can generally represent or correspond to groups of the images 140 that have been partitioned or classified based on their similarity to one another, and/or data that can be used to classify or partition the images 140 into different groups (e.g., data that maps the images 140 the images to different groups). The database 210 can also store other information associated with the image cluster results (e.g., such as statistical information related to the cluster results, graphs and charts associated with the cluster results, confidence measures associated with the cluster results, and/or any other information that is computed during the classification process). Although not explicitly shown in FIG. 2, the database 210 can further store the information associated with extracted multi-view features 160, fused binary representations 170, and/or binary cluster structures 245.

The feature extraction function 220 can be configured to extract features 160 from each of the images 140 using one or one more feature descriptors 225. Each feature descriptor 225 can correspond to an image descriptor or visual descriptor that is able to analyze an image 140 and output a set of features corresponding to the image 140 (e.g., features corresponding to shape, color, texture, and/or motion information in the images 140). Exemplary types of feature descriptors 225 include LBP, HOG, and GIST. Other types of descriptors 225 may also be utilized. As mentioned above, the features 160 from each descriptor 225 can represent a different view or perspective of the images 140. When viewed collectively, the features can comprise a multi-view feature set 160. Because each of the descriptors 225 can represent the features in a different format or different manner, the feature extraction function 220 can also be configured to execute a normalization process that allows features from each view to be compared against one another.

The joint machine learning function 250 includes a binary compression learning function 230 that is configured to learn the fused binary representation 170, and a cluster structure learning function 240 that is configured to learn binary cluster structures 245. As explained in further detail below, in certain embodiments, the joint machine learning function 250 executes an optimization algorithm that alternates between optimizing the binary compression learning function 230 and the cluster structure learning function 240. The binary compression learning function 230 can execute an algorithm for optimizing the fused binary representation 170 and the manner in which the multi-view features are projected onto a common Hamming space.

The cluster structure learning function 240 can execute an algorithm for optimizing the binary cluster structures 245. In certain embodiments, the cluster structures 245 can correspond to a factorized representation of the fused binary representation 170. For example, in certain embodiments, the binary cluster structures 245 can comprise a cluster centroid matrix and a cluster indicator matrix. The cluster centroid matrix can be utilized to identify a centroid (e.g., a central vector or central point) for each cluster 190, while the cluster indicator matrix can be used to indicate distances from the centroid. In certain embodiments, the clustering function 180 partitions the images 140 in a dataset into separate clusters 190 by using the binary cluster structures 245 to assign each image to a centroid. The cluster centroid matrix and a cluster indicator matrix can be multiplied together to recreate the fused binary representation 170. The joint machine learning function 250 executes an algorithm that alternates in optimizing the binary cluster structures 245 and the fused binary representation 170 until an acceptable convergence has been attained for both objectives.

Exemplary embodiments of the multi-view image clustering system 150 and the aforementioned sub-components (e.g., the database 210, feature extraction component 220, binary compression learning function 230, cluster structure learning function 240, and joint machine learning function 250) are described in further detail below. While the sub-components of the MVIC system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the MVIC system 150 may be illustrated as being implemented in software in certain portions of this disclosure, it should be recognized that the sub-components described herein may be implemented in hardware and/or software.

Figure 3:
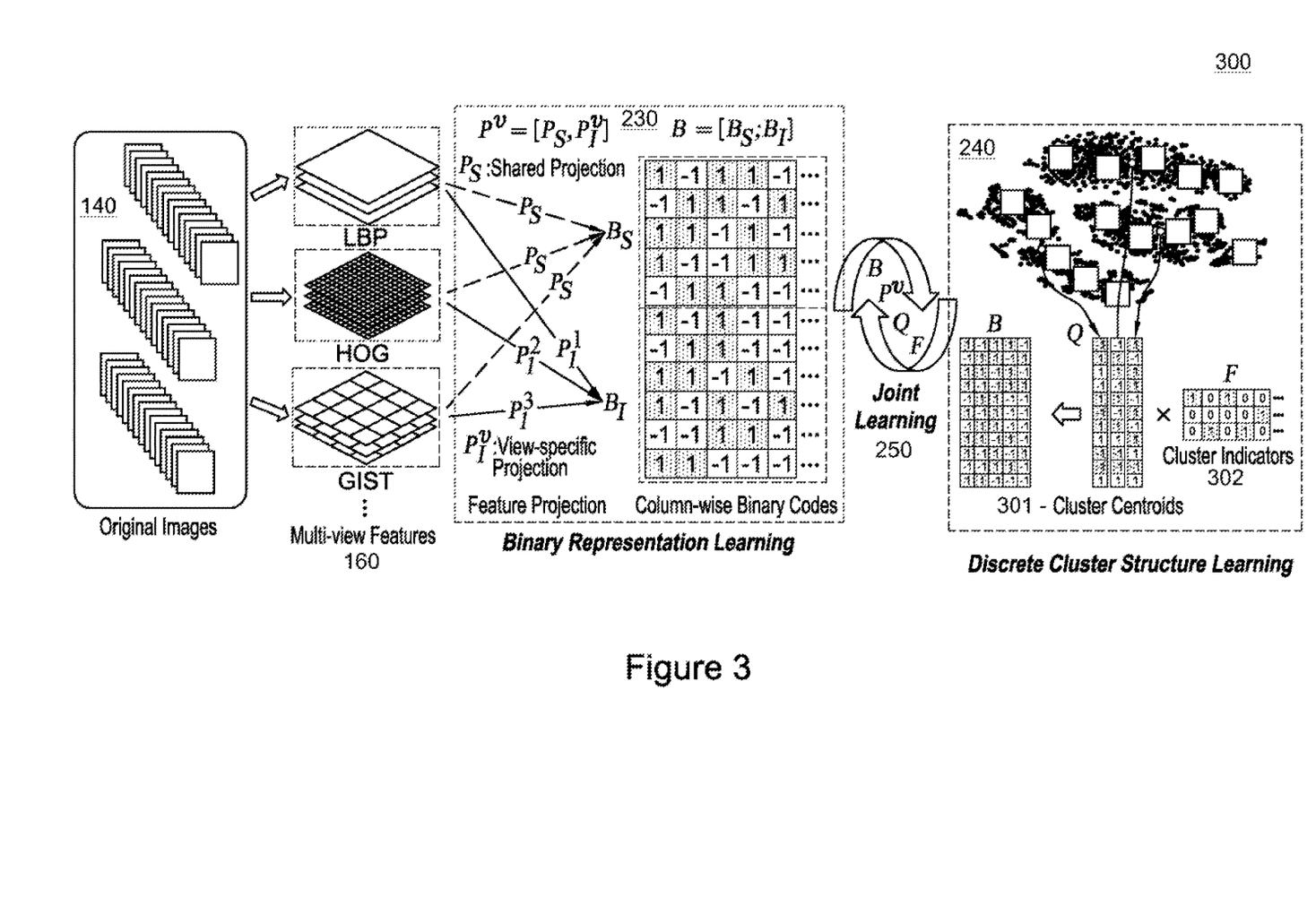
FIG. 3 is a flow diagram illustrating an exemplary architecture for a multi-view image clustering system in accordance with certain embodiments.

FIG. 3 is a flow diagram that provides an overview of an exemplary architecture 300 for an MVIC system 150 in accordance with certain embodiments. Starting from the left side of FIG. 3, a set of multi-view features 160 is derived from images 140. In this exemplary embodiment, the multi-view features include LBP features, HOG features, and GIST features. After the multi-view features 160 are normalized, the multi-view features 160 are projected onto a common space (e.g., a Hamming space). The projected features include shared projections (e.g., indicating overlapping features among two or more views) and view-specific projections (e.g., indicating heterogeneous or individual features that are unique to one or more of the views). The projected features are utilized by the binary compression learning function 230 to generate the fused binary representation 170. The cluster structure learning function 240 factorizes the fused binary representation 170 into a cluster centroid matrix 301 and a cluster indicator matrix 302. In this exemplary embodiment, there are three clusters 190 of images 140. The cluster centroid matrix 301 can identify a centroid associated with each cluster 190 (as shown by the arrows pointing to the cluster centroid matrix 301). The cluster indicator matrix 302 can be used to determine the distance of an image 140 with respect to one or more of the centroids. During the learning process, the joint machine learning function 250 alternates between optimizing the fused binary representation 170 and the binary cluster structure 245, which comprises the cluster centroid matrix 301 and the cluster indicator matrix 302.

An exemplary formulation of a problem that the MVIC system 150 can be configured to solve is provided. Consider a scenario involving a set of multi-view image features $X=\{X^1, \ldots, X^m\}$ from m views, where $X^v=[x_1^v, \ldots, x_N^v] \in \Re^{d_v \times N}$ is the accumulated feature matrix from the v-th view, $d_v$ and N denote the dimensionality and the number of data points in $X^v$, respectively, $x_i^v \in \Re^{d_v \times 1}$ is the i-th feature vector from the v-th view. In this scenario, the primary objective of unsupervised MVIC is to partition X into c groups, where c is the number of clusters. To address the large-scale MVIC problem, the image clustering technique aims to perform binary clustering in the much lower-dimensional Hamming space. Particularly, multi-view compression, which can be performed by projecting multi-view features onto the common Hamming space, can be implemented by learning a compatible common binary representation 170 via complimentary characteristics of multiple views. In addition, robust binary cluster structures 245 are formulated in the learned Hamming space for efficient clustering.

As a preprocessing step, the features from each view can be normalized as zero-centered vectors. Each feature vector can be encoded by the simple nonlinear radial basis function (RBF) kernel mapping, i.e., $\psi(x_i^v)=[\exp(-\|x_1^v-\alpha_1^v\|^2/\gamma), \ldots, \exp(-\|x_l^v-\alpha_l^v\|^2/\gamma)]^T$, where $\gamma$ is the pre-defined kernel width, and $\psi(x_i^v \in \Re^{l \times 1})$ denotes an l-dimensional nonlinear embedding for the i-th feature from the v-th view. $\{\alpha_i^v\}_{i=1}^l$ are randomly selected l anchor points from $X^v$ (l=1000 can be used for each view in some embodiments). The discussion below demonstrates exemplary techniques for learning the fused binary representation 170 and robust binary cluster structure 245 respectively, and provides an example of a joint learning objective that can be utilized by the joint machine learning function 250.

Fused Binary Representation Learning

This section describes an exemplary technique that may be utilized by the binary compression learning function 230 to learn the fused binary representation 170.

Consider a scenario involving a family of K hashing functions to be learned, which quantize each $\psi(x_i^v)$ into a binary representation by $b_i^v=[b_{i1}^v, \ldots, b_{iK}^v]^T \in \{-1,1\}^{K \times 1}$. To eliminate the semantic gaps between different views, the binary compression learning function 230 generates the fused binary representation 170 by combining multi-view features 160. Specifically, the features 160 from multiple views are projected onto a common Hamming space, i.e., $b_i=\text{sgn}((P^v)^T \psi(x_i^v))$, where $b_i$ is the common binary code of the i-th features from different views (i.e., $x_i^v$, $\forall v=1, \ldots, m$), sgn(•) is an element-wise sign function, $P^v=[p_1^v, \ldots, p_K^v] \in \Re^{l \times K}$ is the mapping matrix for the v-th view, and $p_i^v$ is the projection vector for the i-th hashing function. As such, the learning function can be constructed by minimizing the following quantization loss:

$$\min_{P^v,b_i} \sum_{v=1}^{m} \sum_{i=1}^{N} \|b_i - (P^v)^T \psi(x_i^v)\|_F^2 \quad (1)$$

where: $P^v$ is the mapping matrix for the v-th view; $\psi(x_i^v)$ is the nonlinear embedding for the i-th feature from the v-th view; m and N are the number of views and data, respectively.

Because different views describe the same subject from different perspectives, the projection $\{P^v\}_{v=1}^m$ should capture the shared information that maximizes the similarities of multiple views, as well as the view-specific/individual information that distinguishes individual characteristics between different views. To this end, each projection can be decomposed into the combination of sharable and individual projections, i.e., $P^v=[P_S,P_I^v]$. Specifically, $P_S \in \Re^{l \times K_S}$ is the shared projection across multiple views, while $P_I^v \in \Re^{l \times K_I}$ is the individual projection for the v-th view, where $K=K_S+K_I$. Therefore, the binary compression learning function 230 collectively learns the fused binary representation 170 from multiple views using:

$$\min_{P^v,B,\alpha^v} \Sigma_{v=1}^{m}(\alpha^v)^r(\|B-(P^v)^T\psi(X^v)\|_F^2 + \lambda_1\|P^v\|_F^2),$$

$$\text{s.t. } \Sigma_v \alpha^v=1, \alpha^v>0, B=[B_S;B_I]\in\{-1,1\}^{K\times N}, P^v=[P_S,P_I^v], \quad (2)$$

where: $\alpha^v$ is the weight on the v-th view; r>1 is a constant; B is the learned binary codes matrix; $P^v$ is the mapping matrix for the v-th view; $\psi(X^v)$ is the nonlinear embedding matrix for the data from the v-th view; m is the number of views; $B_S$ and $B_I$ respectively denote the shared and view-specific binary codes learned from multi-view data; $P_S$ is the shared projection across multiple views; $P_I^v$ is the individual projection for the v-th view; K and N are the given code length and the number of data, respectively.

In this equation, $B=[b_1, \ldots, b_N]$, $\alpha=[\alpha^1, \ldots, \alpha^m]\in\Re^m$ weighs the importance of different views, r>1 is a constant managing the weight distributions, and $\lambda_1$ is a regularization parameter. The second term is a regularizer to control the parameter scales.

Moreover, from the information-theoretic point of view, the information provided by each bit of the binary codes should be maximized. Therefore, an additional regularizer can be adopted for the binary codes B using maximum entropy principle, i.e., max var[B]=var[sgn((P^v)^T \psi(x_i^v))]. This additional regularization on B can ensure a balanced partition and reduce the redundancy of the binary codes. The sign function can be replaced by its signed magnitude, and the relaxed regularization can be formulated as follows:

$$\max\Sigma_k \mathbb{E}[(p_i^v)^T \psi(x_i^v)\|^2] = \frac{1}{N} tr((P^v)^T \psi(X^v)\psi(X^v)^T P^v) = g(P^v) \quad (3)$$

where: $P^v$ is the mapping matrix for the v-th view; $p_i^v$ denotes the i-th column of $P^v$; $\psi(x_i^v)$ is the nonlinear feature embedding for the i-th feature from the v-th view; N is the number of data.

The problems in Equations (2) and (3) can be combined together and the overall fused binary representation learning problem can be formulated as the following:

$$\min_{P^v,B} \Sigma_{v=1}^{m}(\alpha^v)^r(\|B-(P^v)^T\psi(X^v)\|_F^2 + \lambda_1\|P^v\|_F^2 - \lambda_2 g(P^v)),$$

$$\text{s.t. } \Sigma_v \alpha^v=1, \alpha^v>0, B=[B_S;B_I]\in\{-1,1\}^{K\times N}, P^v=[P_S,P_I^v], \quad (4)$$

where: $\alpha^v$ is the weight on the v-th view; r>1 is a constant; B is the learned binary codes matrix; $P^v$ is the mapping matrix for the v-th view; $\psi(X^v)$ is the nonlinear embedding matrix for the data from the v-th view; m is the number of views; $B_S$ and $B_I$ respectively denote the unified sharable and view-specific binary codes learned from multi-view data; $P_S$ is the shared projection across multiple views; $P_I^v$ is the individual projection for the v-th view; K and N are the given code length and the number of data, respectively; $\lambda_1$ and $\lambda_2$ are the weighting parameters.

Binary Cluster Structure Learning

This section describes an exemplary technique that may be utilized by the cluster structure learning function 240 to learn the binary cluster structures 245.

For binary clustering, the learned binary representation B can be factorized into the binary clustering centroids Q and discrete clustering indicators F using:

$$\min_{Q,F}\|B-QF\|_{21}, \text{s.t. } Q1=0, Q\in\{-1,1\}^{K\times c}, F\in\{0,1\}^{c\times N}, \Sigma_j f_{ji}=1, \quad (5)$$

where: B is the learned binary codes matrix; Q and F are the learned binary clustering centroids matrix and discrete clustering indicators matrix, respectively; $f_{ji}$ denotes the j-th row and i-th column element of matrix F.

In this equation, $\|A\|_{21}=\Sigma_i\|\alpha^i\|_2$, and $\alpha^i$ is the i-th row of matrix A. The first constraint of this equation ensures the balanced property on the clustering centroids as with the binary codes. The $l_{21}$-norm imposed on the loss function can also be replaced by the F-norm, i.e., $\|B-QF\|_F^2$. However, the F-norm based loss function can amplify the errors induced from noise and outliers. Therefore, to achieve a more stable and robust clustering performance, the sparsity-induced $l_{21}$-norm can be utilized. The $l_{21}$-norm not only preserves the rotation invariance within each feature, but also controls the reconstruction error, which significantly mitigates the negative influence of the representation outliers.

Joint Optimization

This section describes an exemplary technique that may be utilized by the joint machine learning function 250 to jointly optimize the binary compression learning function 230 and the cluster structure learning function 240.

To preserve the semantic interconnection between the learned binary codes and the robust cluster structures, a joint learning framework is applied. This unified framework can interactively enhance the qualities of the learned binary representation 170 and cluster structures 245. Hence, the following joint objective function is provided:

$$\min_{P^v,B,Q,F,\alpha^v} \Sigma_{v=1}^{m}(\alpha^v)^r\left(\|B-(P^v)^T\psi(X^v)\|_F^2 + \lambda_1\|P^v\|_F^2 - \lambda_2 g(P^v)\right) + \quad (6)$$

$$\lambda_3\|B-QF\|_{21},$$

$$\text{s.t. } \sum_v \alpha^v = 1, \alpha^v > 0, B = [B_S; B_I] \in \{-1,1\}^{K\times N}, P^v = [P_S, P_I^v],$$

$$Q1 = 0, Q \in \{-1,1\}^{K\times c}, F \in \{0,1\}^{c\times N}, \Sigma_j \int_{ji} = 1,$$

where: $\alpha^v$ is the weight on the v-th view; r>1 is a constant; B is the learned binary codes matrix; $P^v$ is the mapping matrix for the v-th view; $\psi(X^v)$ is the nonlinear embedding matrix for the data from the v-th view; Q and F respectively are the learned binary clustering centroids matrix and discrete clustering indicators matrix; $f_{ji}$ denotes the j-th row and i-th column element of matrix F; $B_S$ and $B_I$ respectively denote the unified sharable and view-specific binary codes learned from multi-view data; $P_S$ is the shared projection across multiple views; $P_I^v$ is the individual projection for the v-th view; K is the given code length; m, c and N are and the number of views, clusters and data, respectively; $\lambda_1$, $\lambda_2$ and $\lambda_3$ are the weighting parameters.

Below is an exemplary algorithm that can be utilized to implement this joint learning framework.

---

Algorithm 1: Highly-Economized Scalable Image Clustering Algorithm

Input : Multi-view features $\{X^v\}_{v=1}^m \in \Re^{d_v \times N}$, m ≥ 3; code length K; number of centroids c; maximum iterations κ and t; $\lambda_1, \lambda_2$ and $\lambda_3$.
Output: Binary representation B, cluster centroid Q and cluster indicator F.
Initial. : Randomly select l anchor points from each view to calculate the kernelized feature embedding $\psi(X^v) \in \Re^{l \times N}$, and normalize them to have zero-centered mean.
repeat
  $P_S$-Step: Update $P_S$ by Equation (8);
  $P_I^v$-Step: Update $P_I^v$ by Equation (9), ∀v =1, ... , m;
  B-Step: Update B by Equation (12);
  repeat
    Q-Step: Iteratively update Q by Equation (14);
    F-Step: Update F by Equation (16);
  until convergence or reach k iterations;
  α-Step: Update α by Equation (18);
until convergence or reach t iterations;

---

In Algorithm 1 above, $\lambda_1$, $\lambda_2$ and $\lambda_3$ are trade-off parameters to balance the effects of different terms. To optimize the discrete programming problem, a newly-derived alternating optimization algorithm is developed as discussed below.

The solution to the problem in Equation (6) is non-trivial because it involves a mixed binary integer program with three discrete constraints, thus leading to an NP-hard problem. In the following, we introduce an alternating optimization algorithm to iteratively update each variable while fixing others, i.e., update $P_s \to P_I^v \to B \to Q \to F \to \alpha$ in each iteration.

Due to the intractable $l_{21}$-norm loss function, the last term in Equation (6) can be rewritten as $\lambda_3 \, tr(U^T DU)$, where $U=B-QF$, and $D \in \Re^{K \times K}$ is a diagonal matrix, the i-th diagonal element of which is defined as $d_{ii}=\frac{1}{2}\|u^i\|$, where $u^i$ is the i-th row of U.

1) $P_s$-Step

This section describes an exemplary technique for performing the $P_s$-Step in Algorithm 1.

When fixing other variables, the sharable projection can be updated by:

$$\min_{P_s} \Sigma_{v=1}^m (\alpha^v)^r \left( \|B_s - P_s^T \psi(X^v)\|_F^2 + \lambda_1 \|P_s\|_F^2 - \frac{\lambda_2}{N} tr(P_s^T \psi(X^v)\psi^T(X^v)P_s) \right) \quad (7)$$

where: $\alpha^v$ is the learned weight on the v-th view; r>1 is a constant; $B_S$ denotes the unified sharable binary codes learned from multi-view data; $P_S$ is the shared projection across multiple views; $\psi(X^v)$ is the nonlinear embedding matrix for the data from the v-th view; m and N are the number of views and data, respectively; $\lambda_1$ and $\lambda_2$ are the weighting parameters.

For notational convenience, $\psi(X^v)\psi^T(X^v)$ can be written as $\tilde{X}$. Taking derivation of $\mathcal{L}$ with respect to $P_s$ and let $$\frac{\partial \mathcal{L}}{\partial P_s} = 0,$$

the closed-form solution of $P_s$ can then be obtained, i.e., where:

$$A = \left(1 - \frac{\lambda_2}{N}\right) \Sigma_{v=1}^m (\alpha^v)^r \tilde{X} \text{ and } T = \Sigma_{v=1}^m (\alpha^v)^r \psi(X^v) \quad (8)$$

where: $\alpha^v$ is the weight on the v-th view; r>1 is a constant; $\psi(X^v)$ is the nonlinear embedding matrix for the data from the v-th view; m and N are the number of views and data, respectively; $\lambda_2$ is a weighting parameter.

2) $P_I^v$-Step

This section describes an exemplary technique for performing the $P_I^v$-Step in Algorithm 1.

Similarly, when fixing other parameters, the optimal solution of the v-th individual projection matrix can be determined by solving:

$$\min_{P_I^v} \|B_I - (P_I^v)^T \psi(X^v)\|_F^2 + \lambda_1 \|P_I^v\|_F^2 - \frac{\lambda_2}{N} tr(P_I^v \tilde{X}(P_I^v)^T), \quad (9)$$

where: $P_I^v$ is the individual projection for the v-th view; $B_I$ denotes the unified view-specific binary codes learned from multi-view data; $\psi(X^v)$ is the nonlinear embedding matrix for the data from the v-th view; $\lambda_1$ and $\lambda_2$ are the weighting parameters; $\tilde{X}=\psi(X^v)\psi^T(X^v)$.

Its closed-form solution can be obtained by $P_I^v = W\psi(X^v)B^T$, where $$W = \left(\left(1 - \frac{\lambda_2}{N}\right)\tilde{X} + \lambda_1 I\right)^{-1}$$

can be calculated beforehand.

3) B-Step

This section describes an exemplary technique for performing the B-Step in Algorithm 1.

The problem in Equation (6) with regards to B can be rewritten as:

$$\min_B \Sigma_{v=1}^m (\alpha^v)^r (\|B - (P^v)^T \psi(X^v)\|_F^2) + \lambda_3 tr(U^T DU), \text{s.t.} \\ B \in \{-1,1\}^{K \times N} \quad (10)$$

where: $\alpha^v$ is the weight on the v-th view; r>1 is a constant; B is the learned unified binary codes matrix; $P^v$ is the mapping matrix for the v-th view; $\psi(X^v)$ is the nonlinear embedding matrix for the data from the v-th view; $\lambda_3$ is a weighting parameter; U=B−QF; D is a diagonal matrix with the i-th diagonal element of D, i.e. $d_{ii}=1/(2\|u^i\|)$, where $u^i$ is the i-th row of U.

Because B only has '1' and '−1' entries and D is a diagonal matrix, both $tr(BB^T)=tr(B^TB)=KN$ and $tr(B^TDB)=N*tr(D)$ are constant terms with regards to B. Based on this and with some further algebraic computations, Equation (10) can be reformulated as:

$$\min_B -2tr[B^T(\Sigma_{v=1}^m(\alpha^v)^r((P^v)^T)\psi(X^v)+\lambda_3 QF)]+\text{const}, \text{s.t. } B\in\{-1,1\}^{K\times N}, \quad (11)$$

where: B is the learned binary codes matrix; $\alpha^v$ is the weight on the v-th view; r>1 is a constant; $P^v$ is the mapping matrix for the v-th view; $\psi(X^v)$ is the nonlinear embedding matrix for the data from the v-th view; Q and F are the learned binary clustering centroids matrix and discrete clustering indicators matrix, respectively; K is the given code length; N is the number of data.

In the above equation, 'const' denotes the constant terms. This problem has a closed-form solution:

$$B=\text{sgn}(\Sigma_{v=1}^m(\alpha^v)^r((P^v)^T\psi(X^v)+\lambda_3 QF). \quad (12)$$

where: $\alpha^v$ is the weight on the v-th view; r>1 is a constant; $P^v$ is the mapping matrix for the v-th view; $\psi(X^v)$ is the nonlinear embedding matrix for the data from the v-th view; Q and F respectively are the learned binary clustering centroids matrix and discrete clustering indicators matrix; $\lambda_3$ is a weighting parameter.

4) Q-Step

This section describes an exemplary technique for performing the Q-Step in Algorithm 1.

Initially, Equation (6) can be degenerated into the following computationally feasible problem (by removing some irrelevant parameters and discarding the first constraint):

$$\min_{Q,F} tr(U^TDU)+v\|Q^T 1\|_F^2, \text{s.t. } Q\in\{-1,1\}^{K\times c}, F\in\{0,1\}^{c\times N}, \Sigma_j f_{ji}=1. \quad (13)$$

where: U=B−QF; D is a diagonal matrix with $d_{ii}=1/(2\|u^i\|)$, where $u^i$ is the i-th row of U; Q and F are the learned binary clustering centroids matrix and discrete clustering indicators matrix, respectively; $f_{ji}$ denotes the j-th row and the i-th column element of matrix F; K is the given code length; c and N are the number of clusters and data, respectively; v is a weighting coefficient.

With sufficiently large v>0, the problems in Equations (6) and (13) will be equivalent. Then, by fixing the variable F, problem (13) becomes:

$$\min_Q \mathcal{L}(Q)=-2tr(B^TDQF)+v\|Q^T 1\|_F^2+\text{const}, \text{s.t.}$$
$$Q\in\{-1,1\}^{K\times c}. \quad (14)$$

where: B is the learned binary codes matrix; D is a diagonal matrix with $d_{ii}=1/(2\|u^i\|)$, where $u^i$ is the i-th row of (B−QF); Q and F are the learned binary clustering centroids matrix and discrete clustering indicators matrix, respectively; K is the given code length; c is the number of clusters; v is a weighting coefficient.

An adaptive discrete proximal linearized optimization algorithm can be developed which iteratively updates Q in the (p+1)-th iteration by $Q^{p+1}=\text{sgn}$ $$\left(Q^p - \frac{1}{n}\nabla\mathcal{L}(Q^p)\right),$$

where $\nabla\mathcal{L}(Q)$ is the gradient of $$\mathcal{L}(Q), \frac{1}{n}$$

is the learning step size, and n∈(C,2C), where C is the Lipschitz constant. For the very special sgn(•) function, if the step size 1/n is too small/large, the solution of Q will get stuck in a bad local minimum or diverge. To this end, a proper n is adaptively determined by enlarging or reducing based on the changing values of $\mathcal{L}(Q)$ between adjacent iterations, which can accelerate its convergence.

5) F-Step

This section describes an exemplary technique for performing the F-Step in Algorithm 1.

When fixing Q, the problem with regards to F turns into the following:

$$\min_{f_i}\Sigma_{i=1}^N d_{ii}\|b_i-Qf_i\|_{2,1}, \text{s.t. } f_i\in\{0,1\}^{c\times 1}, \Sigma_j f_{ji}=1. \quad (15)$$

where: $d_{ii}=1/(2\|u^i\|)$ is the i-th diagonal element of matrix D; $u^i$ is the i-th row of (B−QF); Q and F are the learned binary clustering centroids matrix and discrete clustering indicators matrix, respectively; $b_i$ is the i-th column of the learned binary code matrix B; $f_i$ is the i-th column of matrix F; $f_{ji}$ denotes the j-th row and the i-th column element of matrix F; c is the number of clusters.

The above problem can be divided into N sub-problems, and independently optimize the cluster indicator in a column-wise fashion. That is, one column of F (i.e., $f_i$) is computed at each time. Specifically, the sub-problems can be solved in an exhaustive search manner, similar to a conventional k-means algorithm. Regarding the i-th column $f_i$, the optimal solution of its j-th entry can be efficiently obtained by:

$$f_{ji} = \begin{cases} 1, & j = \text{argmin}_k\ H(d_{ii}*b_i, q_\wp), \\ 0, & \text{otherwise}, \end{cases} \quad (16)$$

where: $f_{ji}$ denotes the j-th row and i-th column entry of the clustering indicators matrix F; $d_{ii}=1/(2\|u^i\|)$ is the i-th diagonal element of matrix D; $b_i$ is the i-th column of the learned binary code matrix B; $q_\wp$ is the $\wp$-th vector of Q.

In the above equation, $q_\wp$ is the $\wp$-th vector of Q, and H(•,•) denotes the Hamming distance metric. Note that computing the Hamming distance is remarkably faster than the Euclidean distance, so the assigned vector $f_i$ will efficiently constitute the matrix F.

6) α-Step

This section describes an exemplary technique for performing the α-Step in Algorithm 1.

Let $h^v=\|B-(P^v)^T\phi X^v\|_F^2+\lambda_1\|P^v\|_F^2-\lambda_2 g(P^v)$, then the problem in Equation (6) with regards to α can be rewritten as:

$$\min_{\alpha^v}\Sigma_{v=1}^m(\alpha^v)^r h^v, \text{s.t. } \Sigma_v \alpha^v=1, \alpha^v>0 \quad (17)$$

where: $h^v=\|B-(P^v)^T\phi X^v\|_F^2+\lambda_1\|P^v\|_F^2-\lambda_2 g(P^v)$; $\alpha^v$ is the weight on the v-th view; r>1 is a constant.

The Lagrange function of Equation (17) is $\min \mathcal{L}(\alpha^v,\zeta)=\Sigma_{v=1}^M(\alpha^v)^r h^v-\zeta(\Sigma_{v=1}^m\alpha^v-1)$, where $\zeta$ is the Lagrange multiplier. Taking the partial derivatives with regards to $\alpha^v$ and $\zeta$, respectively, then the result is:

$$\begin{cases} \frac{\partial\mathcal{L}}{\partial\alpha^v} & r(\alpha^v)^{r-1}h^v-\zeta, \\ \frac{\partial\mathcal{L}}{\partial\zeta} & \Sigma_{v=1}^M\alpha^v-1. \end{cases} \quad (18)$$

where: $\alpha^v$ is the weight on the v-th view; $r>1$ is a constant; m is the number of views; $\zeta$ is the Lagrange multiplier.

By setting $\nabla_{\alpha^v,\zeta}\mathcal{L}=0$, the optimal solution of $\alpha^v$ is $$\frac{(h^v)^{\frac{1}{1-r}}}{\Sigma_v(h_v)^{\frac{1}{1-r}}}.$$

To obtain the locally optimal solution to the problem of Equation (6), the six variables described above are iteratively updated until convergence. To deal with the out-of-example problem in image clustering, the binary code can be generated for a new query image from the v-th view $\hat{x}^v$ by $b=\text{sgn}((P^v)^T\psi(\hat{x}^v))$ and then it can be assigned to the j-th cluster decided by $j=\arg\min_k H(b,q_k)$ in the fast Hamming space. The full learning procedure is illustrated in Algorithm 1 above. The learning procedure can be executed by the joint machine learning function 250 described herein.

The computation burden of this technique lies in the compressive binary representation learning and discrete cluster structure learning. The computational complexities of calculating $P_S$ and $P_I^v$ are $\vartheta(K_S lN)$ and $\vartheta(m(K_I lN))$, respectively. Computing B consumes $\vartheta(KlN)$. Constructing the discrete cluster structures can involve $\vartheta(N)$ on bit-wise operators for $\kappa$ iterations, where the distance computation requires only $\vartheta(1)$ per time. The total computational complexity of the learning procedure is $\vartheta(t((K_S+mK_I+K)lN+\kappa N))$, where t and $\kappa$ are empirically set to 10 in certain embodiments. In general, the computational complexity of optimizing the MVIC system 150 is linear to the number of samples, i.e., $\vartheta(N)$.

With regard to memory cost, the mapping matrices $P_S$ and $P_I^v$, are stored which can demand $\vartheta(lK_S)$ and $\vartheta(lK_I)$ memory costs, respectively. Notably, the learned binary representation and discrete cluster centroids only utilize the bit-wise memory load $\vartheta(K(N+c))$, which is much less than that of k-means which requires $\vartheta(K(N+c))$ real-valued numerical storage footprint.

Extensive tests were conducted using the MVIC techniques described herein. The experiments were conducted on four scalable image datasets (i.e., ILSVRC2012 1K, Cifar-10, YouTube Faces, and NUS-WIDE) to evaluate the effectiveness of the system with four frequently-used performance measures. The results were compared to several state-of-the-art clustering methods, including both single-view and multi-view clustering methods. Four widely-used evaluation measures were utilized to assess the results, including clustering accuracy (ACC), normalized mutual information (NMI), purity, and F-score. In addition, both computational time and memory footprint were assessed. The MVIC techniques achieved superior results in comparison to the other clustering methods.

The favorable performance of these techniques can be attributed, at least in part, to the fact that the MVIC techniques disclosed herein benefit from the discrete optimization algorithm such that the learned binary representations can eliminate some redundant and noisy information in the original real-valued features. In addition, with respect to the image clustering, binary features are more robust to local changes because small variations caused by varying environments can be eliminated by quantized binary codes. Further, the unified interactive learning framework of the optimal binary codes and clustering structures is shown to be better than disjointed learning approaches.

Figure 4:
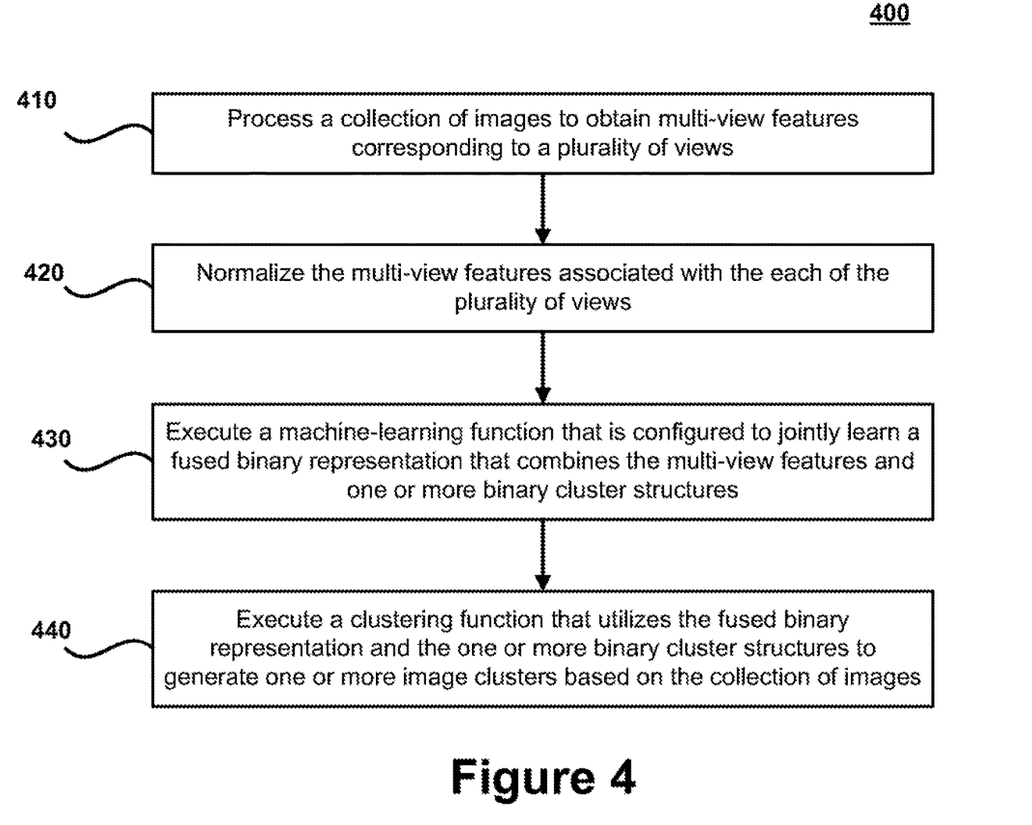
FIG. 4 is a flow chart of a method for implementing a multi-view image clustering technique in accordance with certain embodiments.

FIG. 4 is a flow chart of an exemplary method 400 for performing multi-view image clustering in accordance with certain embodiments. The exemplary method 400 may be executed in whole or in part by the MVIC system 150. For example, one or more storage devices 201 can store instructions for performing the steps of method 400, and one or more processors 202 can be configured to execute performance of the steps of method 400.

At step 410, a collection of images 140 is processed to obtain multi-view features 160 corresponding to a plurality of views. In certain embodiments, the feature extraction function 220 may utilize at least two feature descriptors 225 to derive the multi-view features 160 from the images 140. Exemplary feature descriptors 225 can include LBP, HOG and GIST descriptors.

At step 420, the multi-view features 160 associated with each of the plurality of views are normalized. This step may be performed by the feature extraction function 220 and/or other component of the MVIC system 150. In certain embodiments, normalizing the multi-view features 160 includes transforming features corresponding to each of the plurality of views to zero-centered vectors.

At step 430, a machine learning function 250 is executed to jointly learn a fused binary representation 170 that combines the multi-view features 160 and one or more binary cluster structures 245. In certain embodiments, the machine learning function 250 executes an algorithm that alternates between optimizing the fused binary representation and the one or more binary cluster structures 245. The machine learning function 250 can derive or compute the fused binary representation 170 such that it preserves shared information and view-specific information associated with the plurality of views. The fused binary representation 170 can be factorized into one or more cluster centroid matrices and one or more clustering indicator matrices to derive or compute the binary cluster structures 245.

At step 440, a clustering function is executed that utilizes the fused binary representation 170 and the one or more binary cluster structures 245 to generate one or more image clusters 190 based on the collection of images 140. For example, after the machine learning function 250 trains the fused binary representation 170 and the one or more binary cluster structures 245, the fused binary representation 170 and the one or more binary cluster structures 245 can be applied to partition the collection of images 140 into one or more clusters 190. The partitioned image data can then be utilized by one or more applications for various functions (e.g., related to computer vision applications).

While various novel features of the invention have been shown, described, and pointed out as applied to particular embodiments thereof, it should be understood that various omissions and substitutions and changes in the form and details of the systems and methods described and illustrated herein may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for performing multi-view image clustering comprising:
one or more computing devices comprising one or more processors and one or more non-transitory storage devices for storing instructions, wherein execution of the instructions by the one or more processors causes the one or more computing devices to:
process a collection of images to obtain multi-view features corresponding to a plurality of views;
execute a machine learning function that is configured to jointly learn a fused binary representation that combines the multi-view features and one or more binary cluster structures, wherein the machine learning function executes an algorithm that alternates between optimizing a first objective associated with the fused binary representation and a second objective associated with the one or more binary cluster structures; and
execute a clustering function that utilizes the fused binary representation and the one or more binary cluster structures to generate one or more image clusters based on the collection of images.

2. The system of claim 1, wherein executing the machine learning function to learn a fused binary representation includes projecting the multi-view features onto a Hamming space.

3. The system of claim 2, wherein the machine learning function is configured, at least in part, to:
identify shared information among the plurality of views;
identify view-specific information associated with the plurality of views; and
utilize the shared information and the view-specific information to derive the fused binary representation in a manner that preserves the shared information and the view-specific information associated with the plurality of views.

4. The system of claim 1, wherein execution of the instructions by the one or more processors further causes the one or more computing devices to:
factorize the fused binary representation into one or more cluster centroid matrices and one or more clustering indicator matrices.

5. The system of claim 4, wherein the one or more cluster centroid matrices identify one or more centroids associated with each of the one or more image clusters, and the one or more clustering indicator matrices identify distance measures from the one or more centroids.

6. The system of claim 1, wherein execution of the instructions by the one or more processors further causes the one or more computing devices to:
normalize the multi-view features associated with each of the plurality of views.

7. The system of claim 6, wherein normalizing the multi-view features includes transforming features corresponding to each of the plurality of views to zero-centered vectors.

8. The system of claim 1, wherein the machine learning function executes the algorithm until an acceptable convergence is obtained with respect to optimizing the first objective associated with the fused binary representation and the second objective associated with optimizing the one or more binary cluster structures.

9. The system of claim 1, wherein the system is integrated with a computer vision application.

10. A method for performing multi-view image clustering comprising:
processing a collection of images to obtain multi-view features corresponding to a plurality of views, the collection of images being stored on one or more non-transitory storage devices;
executing, with one or more processors, a machine learning function that is configured to jointly learn a fused binary representation that combines the multi-view features and one or more binary cluster structures, wherein the machine learning function executes an algorithm that alternates between optimizing a first objective associated with the fused binary representation and a second objective associated with the one or more binary cluster structures; and
executing, with one or more processors, a clustering function that utilizes the fused binary representation and the one or more binary cluster structures to generate one or more image clusters based on the collection of images.

11. The method of claim 10, wherein executing the machine learning function to learn a fused binary representation includes projecting the multi-view features onto a Hamming space.

12. The method of claim 11, wherein the machine learning function is configured, at least in part, to:
identify shared information among the plurality of views;
identify view-specific information associated with the plurality of views; and
utilize the shared information and the view-specific information to derive the fused binary representation in a manner that preserves the shared information and the view-specific information associated with the plurality of views.

13. The method of claim 10, further comprising factorizing the fused binary representation into one or more cluster centroid matrices and one or more clustering indicator matrices.

14. The method of claim 13, wherein the one or more cluster centroid matrices identify one or more centroids associated with each of the one or more image clusters, and the one or more clustering indicator matrices identify distance measures from the one or more centroids.

15. The method of claim 10, further comprising normalizing the multi-view features associated with each of the plurality of views.

16. The method of claim 15, wherein normalizing the multi-view features includes transforming features corresponding to each of the plurality of views to zero-centered vectors.

17. The method of claim 10, wherein the machine learning function executes the algorithm until an acceptable convergence is obtained with respect to optimizing the first objective associated with the fused binary representation and the second objective associated with optimizing the one or more binary cluster structures.

18. A computer program product for performing multi-view image clustering, the computer program product comprising a non-transitory computer-readable medium including codes for causing a computer to:
process a collection of images to obtain multi-view features corresponding to a plurality of views;

execute a machine learning function that is configured to jointly learn a fused binary representation that combines the multi-view features and one or more binary cluster structures, wherein the machine learning function executes an algorithm that alternates between optimizing a first objective associated with the fused binary representation and a second objective associated with the one or more binary cluster structures; and execute a clustering function that utilizes the fused binary representation and the one or more binary cluster structures to generate one or more image clusters based on the collection of images.

19. A system for performing multi-view image clustering comprising:

one or more computing devices comprising one or more processors and one or more non-transitory storage devices for storing instructions, wherein execution of the instructions by the one or more processors causes the one or more computing devices to:

process a collection of images to obtain multi-view features corresponding to a plurality of views;

execute a machine learning function that is configured to jointly learn a fused binary representation that combines the multi-view features and one or more binary cluster structures, wherein the fused binary representation is factorized into one or more cluster centroid matrices and one or more clustering indicator matrices; and execute a clustering function that utilizes the fused binary representation and the one or more binary cluster structures to generate one or more image clusters based on the collection of images.

20. A method for performing multi-view image clustering comprising:

processing a collection of images to obtain multi-view features corresponding to a plurality of views, the collection of images being stored on one or more non-transitory storage devices;

executing, with one or more processors, a machine learning function that is configured to jointly learn a fused binary representation that combines the multi-view features and one or more binary cluster structures, wherein the fused binary representation is factorized into one or more cluster centroid matrices and one or more clustering indicator matrices; and executing, with one or more processors, a clustering function that utilizes the fused binary representation and the one or more binary cluster structures to generate one or more image clusters based on the collection of images.

21. A computer program product for performing multi-view image clustering, the computer program product comprising a non-transitory computer-readable medium including codes for causing a computer to:

process a collection of images to obtain multi-view features corresponding to a plurality of views;

execute a machine learning function that is configured to jointly learn a fused binary representation that combines the multi-view features and one or more binary cluster structures, wherein the fused binary representation is factorized into one or more cluster centroid matrices and one or more clustering indicator matrices; and execute a clustering function that utilizes the fused binary representation and the one or more binary cluster structures to generate one or more image clusters based on the collection of images.

* * * * *